(12) United States Patent
Zheng

(10) Patent No.: US 9,740,069 B2
(45) Date of Patent: Aug. 22, 2017

(54) LIQUID CRYSTAL DISPLAY FOR ELIMINATING MOVABLE MURA

(71) Applicant: SHENZHEN CHINA STAR OPTOELECTRONICS TECHNOLOGY CO., LTD., Shenzhen (CN)

(72) Inventor: Hua Zheng, Shenzhen (CN)

(73) Assignee: SHENZHEN CHINA STAR OPTOELECTRONICS TECHNOLOGY CO., LTD, Shenzhen (CN)

( * ) Notice: Subject to any disclaimer, the term of this patent is extended or adjusted under 35 U.S.C. 154(b) by 315 days.

(21) Appl. No.: 14/234,397

(22) PCT Filed: Dec. 11, 2013

(86) PCT No.: PCT/CN2013/089041
§ 371 (c)(1),
(2) Date: Jan. 23, 2014

(87) PCT Pub. No.: WO2015/078048
PCT Pub. Date: Jun. 4, 2015

(65) Prior Publication Data
US 2016/0054630 A1    Feb. 25, 2016

(30) Foreign Application Priority Data
Nov. 29, 2013  (CN) .......................... 2013 1 0627486

(51) Int. Cl.
*G02F 1/1343*    (2006.01)
*G02F 1/1362*    (2006.01)
(Continued)

(52) U.S. Cl.
CPC ...... *G02F 1/136213* (2013.01); *G02F 1/1368* (2013.01); *G02F 1/13439* (2013.01);
(Continued)

(58) Field of Classification Search
CPC ......... G02F 1/136213; G02F 1/136286; G02F 1/134309; G02F 2001/134345
See application file for complete search history.

(56) References Cited

U.S. PATENT DOCUMENTS 5,337,173 A * 8/1994 Atsumi ............ G02F 1/136213
                                                    349/39
7,088,402 B2 * 8/2006 Ochiai .............. G02F 1/136213
                                                    349/38
(Continued)

FOREIGN PATENT DOCUMENTS

CN            102879960 A      1/2013

*Primary Examiner* — Paisley L Arendt
(74) *Attorney, Agent, or Firm* — Mark M. Friedman

(57) ABSTRACT

An array substrate is disclosed. A gate line group, common electrode line and two adjacent data lines together defining a pixel unit which has: a thin film transistor; a first and second pixel electrode disposed between the gate line group and the common electrode line; a sharing capacitor disposed between the gate line group and the pixel electrodes. The pixel units are arranged in a plurality of rows along the extending direction of data line, two adjacent pixel units are arranged sequentially in opposite direction. By using each of the sharing capacitors of the adjacent pixel units, the light leakage regions will be away from the openings of the pixel electrodes, therefore the movable mura can be eliminated without increasing the width of the black matrix and the aperture ratio loss can be solved.

13 Claims, 8 Drawing Sheets

(51) Int. Cl.
*G02F 1/1368* (2006.01)
*G02F 1/1335* (2006.01)

(52) U.S. Cl.
CPC .. *G02F 1/133514* (2013.01); *G02F 1/134309* (2013.01); *G02F 1/136286* (2013.01); *G02F 1/13624* (2013.01); *G02F 1/133512* (2013.01); *G02F 2001/134345* (2013.01)

(56) References Cited

U.S. PATENT DOCUMENTS

| | | | |
|---|---|---|---|
| 7,663,710 B2 * | 2/2010 | Park | G02F 1/134363 349/141 |
| 8,035,765 B2 * | 10/2011 | Tsai | G02F 1/136213 349/39 |
| 2006/0092366 A1 * | 5/2006 | Inoue | G02F 1/133707 349/143 |
| 2012/0033148 A1 | 2/2012 | Yang | |

\* cited by examiner

LIQUID CRYSTAL DISPLAY FOR ELIMINATING MOVABLE MURA

FIELD OF THE INVENTION

The present invention relates to a pixel array substrate and a liquid crystal display thereof. In particular, a pixel unit for eliminating movable mura in vertical alignment liquid crystal displays.

BACKGROUND OF THE INVENTION

In recent years, to eliminate the movable mura phenomenon in vertical alignment (VA) liquid crystal displays, the pixel unit of liquid crystal displays have adopted a charge-sharing technique to improve color shift at large viewing angle. Referring to FIG. 1, a charging gate 101, a sharing gate 102, and a common electrode line 103 and 104 are disposed on a first metal layer. A data line 105, a thin film transistor 106, and a sharing capacitor 107 are disposed on a second metal layer. Components of the first metal layer and components of the second metal layer are electrically connected to each other through contact holes 108 and 109. A pixel electrode layer disposed on the pixel array substrate fowls an opening, allowing light pass through. The opening is further partitioned into a main-opening 110 and a sub-opening 111. However, whether or not the charging gate line 101 and the sharing gate line 102 are being driven, a common electrode of a color filter substrate will cause a positive or negative bias on the sides of the charging gate line 101 and the sharing gate line 102, so as to rotate the liquid crystal and therefore forming light leakage regions 112, 113 and 114.

Referring to FIG. 2, under ideal conditions, the charging gate line 101, the sharing gate line 102, and the light leakage regions 112, 113, and 114 are disposed on the sides of the charging gate line 101 and sharing gate line 102, and are perfectly shielded by a black matrix 201 of the color filter substrate, therefore will not affect a black screen. However, in practice, a relative shift between the array substrate and the color filter substrate can easily occur because these two substrates are attached to each other by using adhesive at the edges of the panel in a vertical alignment liquid crystal display. As shown in FIG. 1, due to the presence of the sharing capacitor 107 and its metallic shielding effect, the light leakage region 114 below the sharing gate line 102 is apart from the sub-opening 111. On the other hand, the light leakage region 112 above the charging gate line 101 is close to the main-opening 110.

However, when an upward shift of the color filter substrate with respect to the array substrate occurs, a light leakage will not occur as long as the length of the shift is less than the width of the sharing capacitor 107, but when a downward shift takes place on the color filter substrate to the array substrate, even a small shift can cause light leakage. Referring to FIG. 3, a downward shift causes a white spot 301, which is due to light leaking through the light leakage region 112 when there is a black screen. Since the white spot 301 will occur when slapping the panel, it is known as movable mura. The solution of this phenomenon so far is to enhance the width of black matrix 201 of the color filter substrate. The black matrix 201 extends inward the main-opening 110 and an extending length is larger than the length of shifting length, so as to prevent light leakage from being exposed in the light leakage region, thus the movable mura is eliminated.

Yet the drawback of above-mentioned solution is that the panel aperture ratio decreases as the width of the black matrix 201 increases, thereby decreasing the transmission ratio of the panel. Accordingly, it is necessary to provide a pixel unit to solve the existing problem.

SUMMARY OF THE INVENTION

The objective of the present invention is to provide an array substrate and a liquid crystal display device thereof so as to eliminate the movable mura phenomenon of a vertical alignment liquid crystal display, as well as to prevent a decrease in aperture ratio.

The other objective of the present invention is to provide an array substrate and a liquid crystal display device thereof so as to decrease the RC delay (Resistor-Capacitor delay) of the data line, and therefore increase the power rate of the pixels.

The present invention relates to an array substrate of a liquid crystal display that comprises: the substrate; a plurality of data lines disposed on the substrate; a plurality of gate line groups intersecting the data lines; a plurality of common electrode lines intersecting the data lines, each common electrode line, gate line group, and two adjacent data lines together defining a pixel unit. The pixel unit comprises: a thin film transistor electrically connected to the data line and the gate line group; a first and a second pixel electrode electrically connected to the thin film transistor and disposed between the gate line group and the common electrode line; and a sharing capacitor electrically connected to the gate line group and disposed between the gate line group and the pixel electrodes.

To achieve the above objectives, the present invention provides an array substrate that differs from the repeating pixel layout substrate of the existing practices. The pixel units are arranged in a plurality of rows along the extending direction of the data line, and two adjacent pixel units are arranged sequentially in the opposite direction. Therefore, the gate line groups of two adjacent pixel units will be close to each other side by side and gathered at the pixel junction. Further, by using each sharing capacitor of the two pixel units, a light leakage region located between the gate line group and the pixel opening will naturally be apart from the pixel opening. Even though an upward or downward shift occurs between the color filter substrate and the array substrate, the pixel opening will be apart from the light leakage region due to the sharing capacitor arrangement. Thus, there is no need to increase the width of the black matrix shielding light leakage. By the present invention, the opening of the black matrix can completely overlap the opening of the pixel unit, and the aperture ratio of the pixel unit will not decrease as the width of the black matrix increases, thus maximizing the aperture ratio of the pixel unit. Accordingly, the movable mura can be eliminated without losing the aperture ratio in the present invention.

With such a configuration, another two adjacent pixel units with their gate line groups are apart from each other will share the same common electrode line. The intersection number of data line and common electrode line will therefore decrease by half, which means that the parasitic capacitance value of the data line and the common electrode line will decrease to half. Thus, not only can the RC delay be effectively decreased and the pixel power rate enhanced, but the cost of extra wiring can also be decreased.

For a better understanding of the aforementioned content of the present invention, preferable embodiments are illustrated in accordance with the attached figures for further explanation.

DETAILED DESCRIPTION OF THE PREFERRED EMBODIMENTS

The following descriptions for the respective embodiments are specific embodiments capable of being implemented for illustrations of the present invention, with reference to the appended figures. The terms up, down, front, rear, left, right, interior, exterior, side, etcetera are merely directions referring to the appended figures. Therefore, such directions are employed for explaining and understanding the present invention, but are not limitations thereto.

Figure 1:
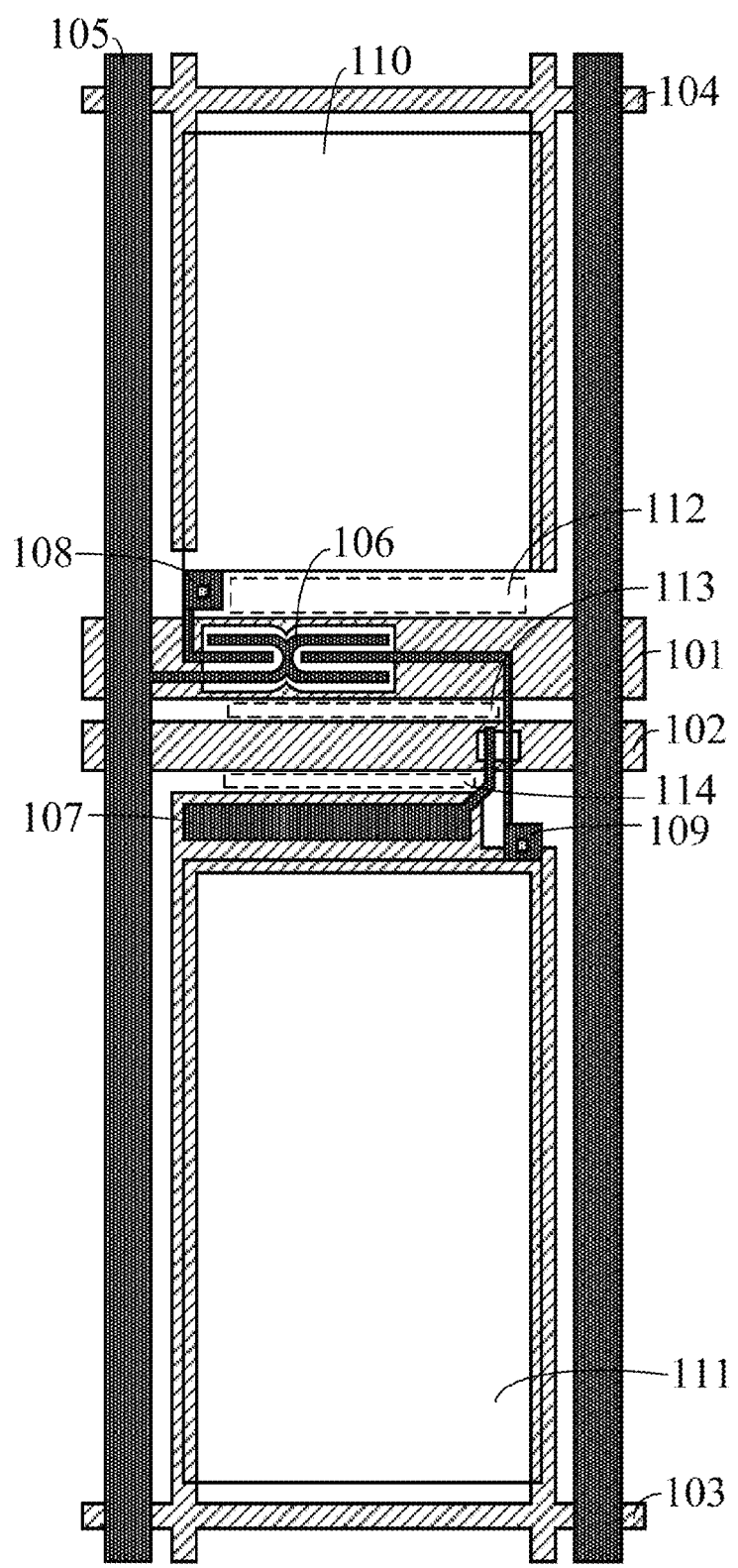
FIG. 1 is a schematic diagram of the prior art pixel unit.
Figure 2:
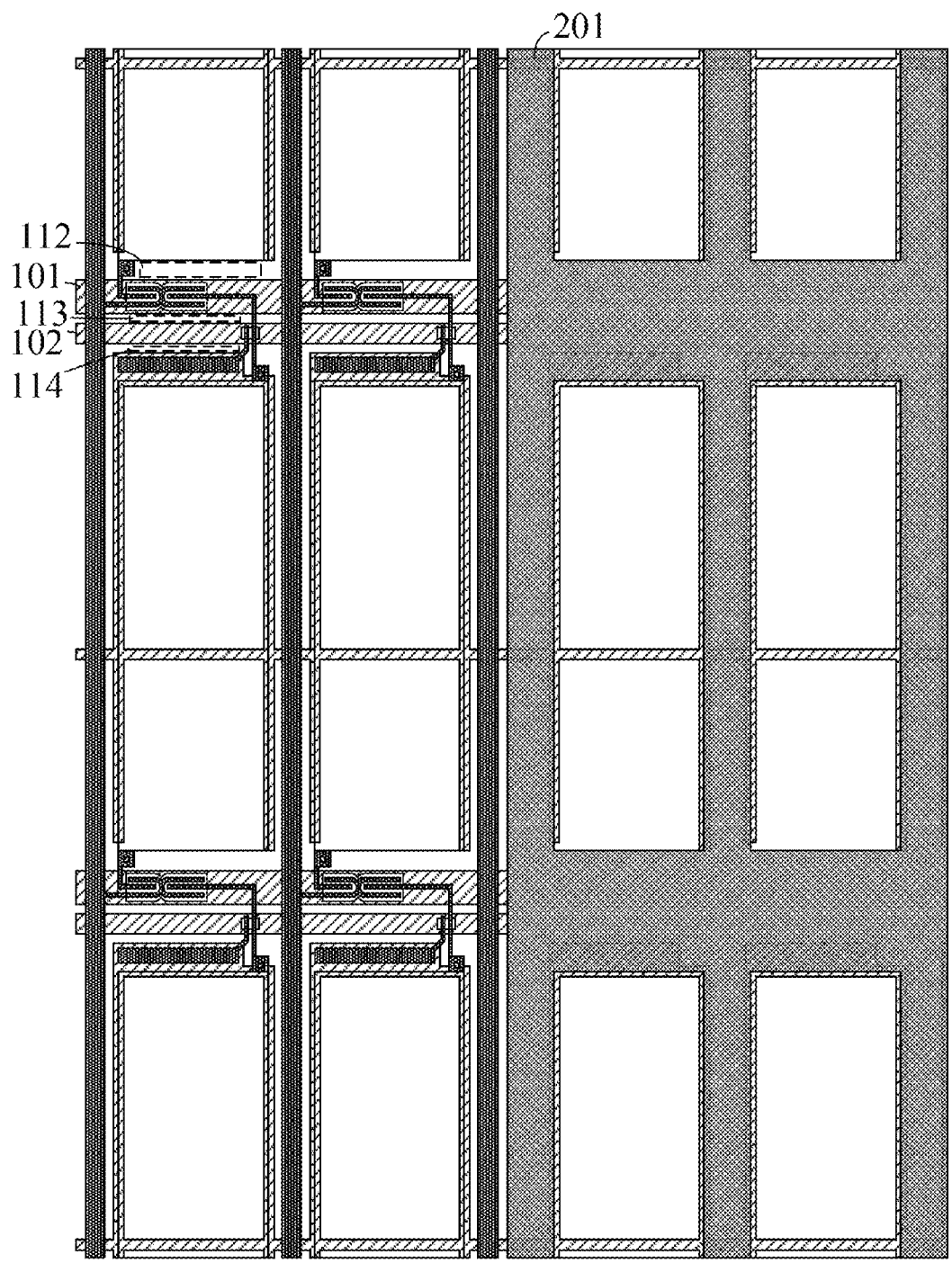
FIG. 2 is a schematic diagram showing that a black matrix perfectly shields an array substrate in the prior art.
Figure 3:
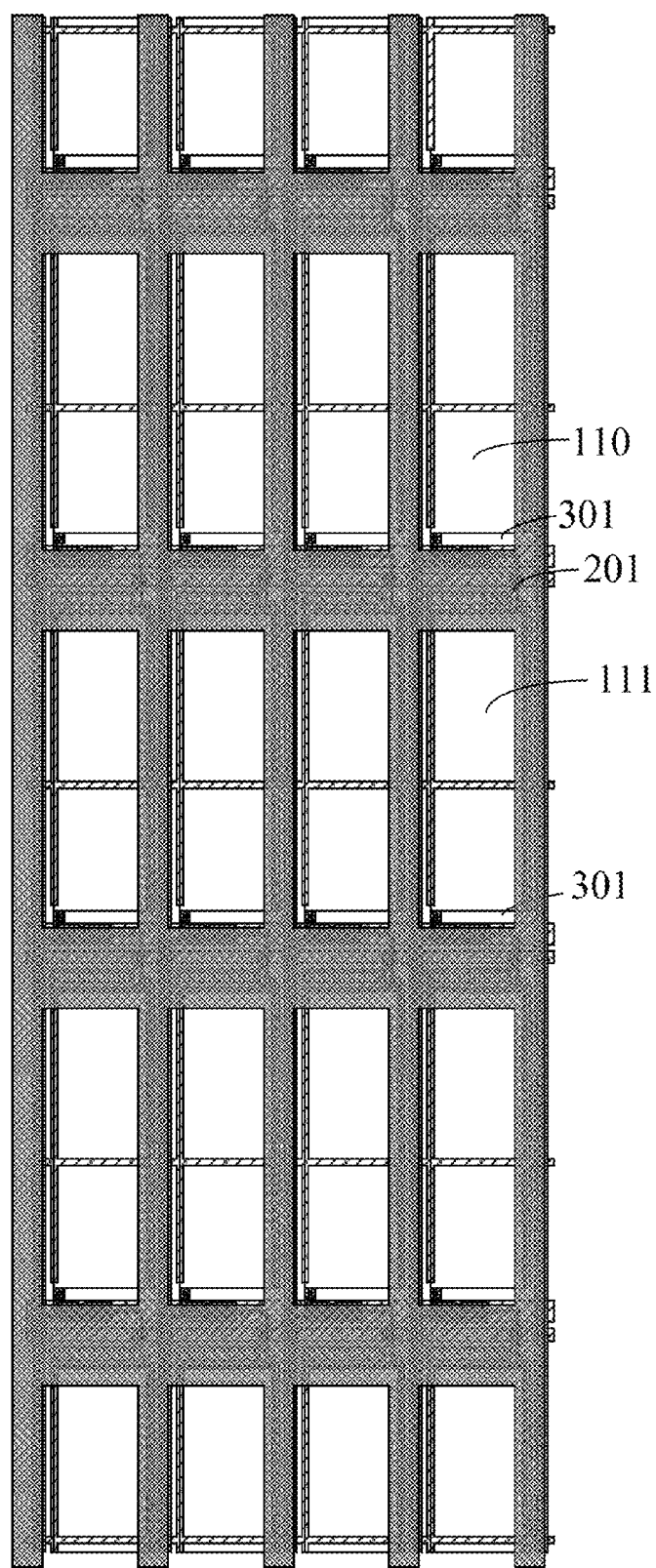
FIG. 3 is a schematic diagram illustrating that the color filter is misaligned with the array substrate in the prior art.
Figure 4:
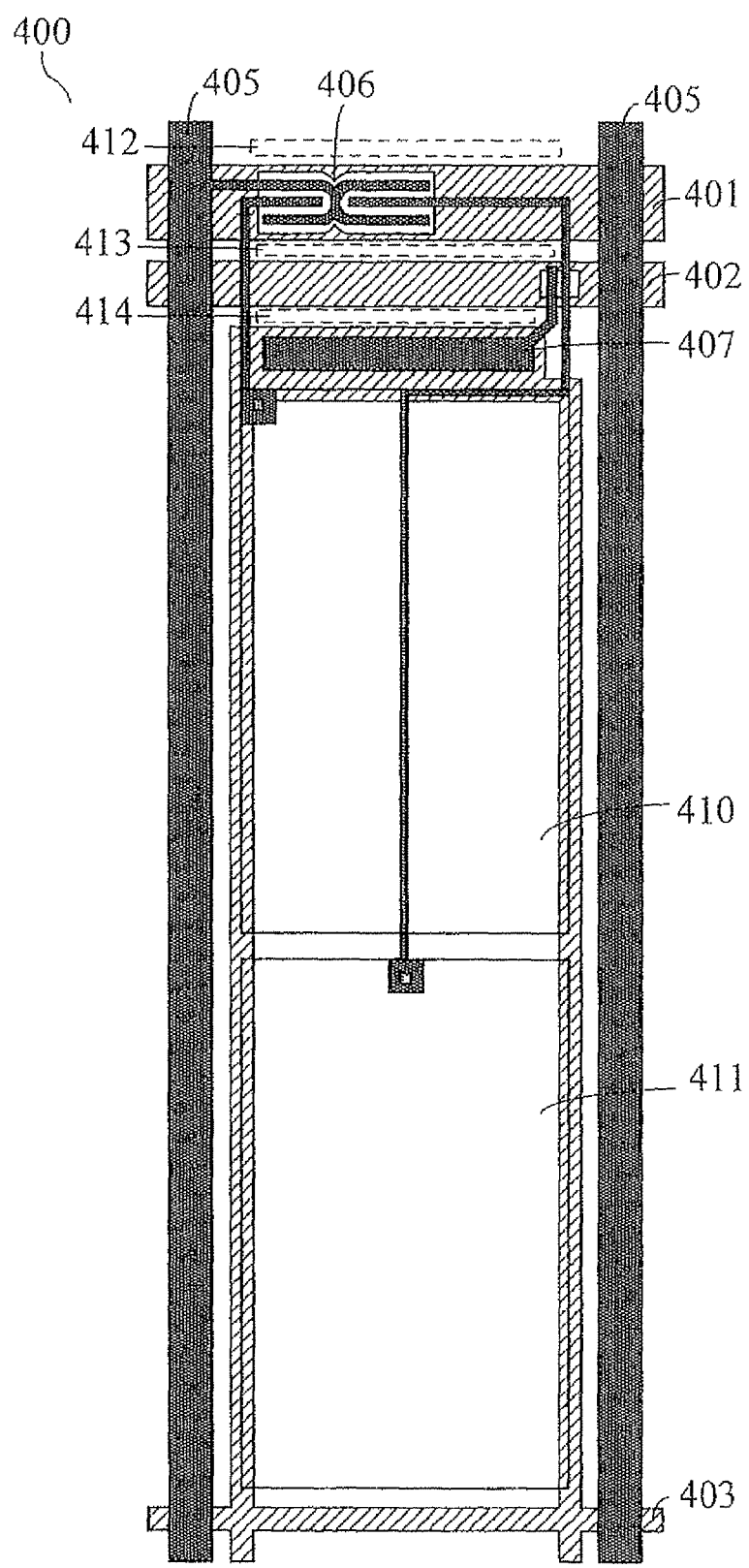
FIG. 4 is a schematic diagram of the pixel unit of the present invention.

FIG. 4 depicts a pixel unit of the present invention, the pixel unit is an intersection region defined by two adjacent data lines 405, a charging gate line 401, and a common electrode line 403, wherein the data line 405 is configured to transmit the pixel data signal; the charging gate line 401 is configured to transmit gate driving signal; the common electrode line 403 is configured to provide the common voltage to the pixel. The pixel unit 400 comprises: a thin film transistor 406 electrically connected to the data line 405 and the charging gate line 401; a first pixel electrode 410 and a second pixel electrode 411 each electrically connected to the thin film transistor 406, which applies a driving voltage corresponding to the pixel data signal to the pixel electrode, both electrodes are disposed between the charging gate line 401 and the common electrode line 403. In addition, the present invention further comprises a sharing gate line 402 and a sharing capacitor 407, which are electrically connected to the sharing gate line 402 between the charging gate line 401 and the first pixel electrode 410.

The above mentioned first pixel electrode 410 and the second pixel electrode 411 respectively form a main-opening and a sub-opening of the pixel unit. When the "ON" voltage is applied to the charging gate line 401, the data line 405 applies an image voltage signal to the pixel electrodes 410 and 411 of the main-opening and the sub-opening through the thin film transistor 406. When the voltage switches "OFF" to the charging gate line 401, the sharing gate line 402 turns "ON" immediately. The sharing capacitor 407, which is electrically connected to the sharing gate line 402, is conducted to the pixel electrodes 410 and 411, and balances the charge thereon of the main-opening and the sub-opening. The voltage of the pixel electrode 410 and 411 in the main-opening and the sub-opening can therefore be adjusted to a proper proportion.

Since the sharing capacitor 407 is disposed between the sharing gate line 401 and the first pixel electrode 410, and gathered at the top portion of the pixel unit 400 together with the charging gate line 401 and the sharing gate line 402, the light leakage regions 412, 413 and 414 at the sides of the charging gate line 401 and the sharing gate line 402 are therefore limited to the top portion of the sharing capacitor 407, and the leakage region 414 can naturally be apart from the main-opening and the sub-opening.

Wherein the width of the sharing capacitor is between 6-30 μm, the pixel electrodes are transparent electrodes and the preferred material is Indium Tin Oxide (ITO).

Figure 5:
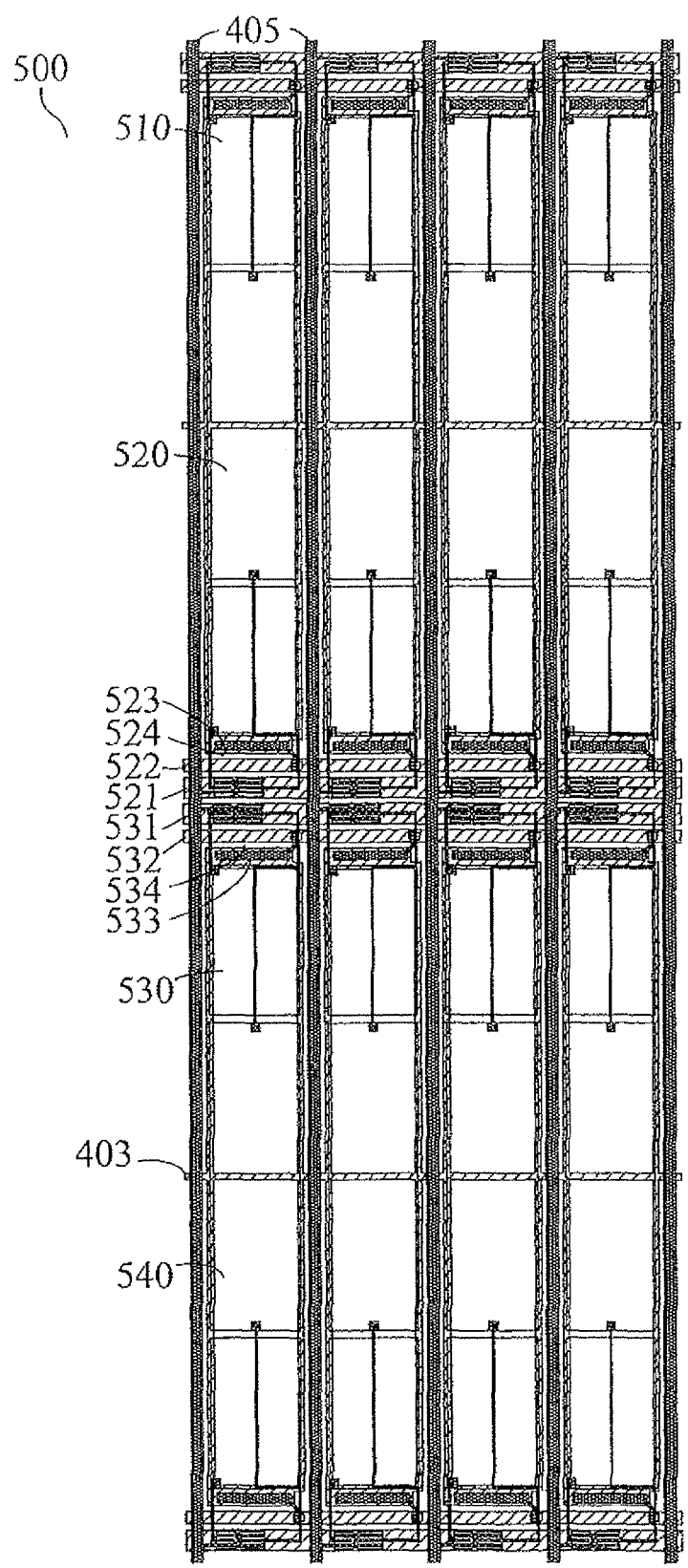
FIG. 5 is a schematic diagram of the pixel unit layout of the present invention.

FIG. 5 depicts a schematic diagram of a pixel unit layout as the first embodiment of the present invention. The pixel units are arranged in a plurality of rows along the extending direction of the data line 405 on the substrate 500. Two adjacent pixel units are arranged sequentially in the opposite direction. In other words, the pixel units 510, 520, 530 and 540 are up-and-down sequentially arranged. With such a configuration, the charging gate lines 521 and 531 of the two adjacent pixel units 520 and 530 will be close to each other side by side and be gathered at the pixel junction, the sharing gate lines 522 and 532 with the sharing capacitors 523 and 533 of these two adjacent pixel units will also be gathered together at the pixel junction. Further, by using each of the sharing capacitors 523 and 533 of the two adjacent pixel units 520 and 530, the light leakage regions 523 and 534 below the corresponding sharing gate lines 522 and 532 will naturally be apart from the openings of the pixel electrodes 520 and 530.

Figure 6:
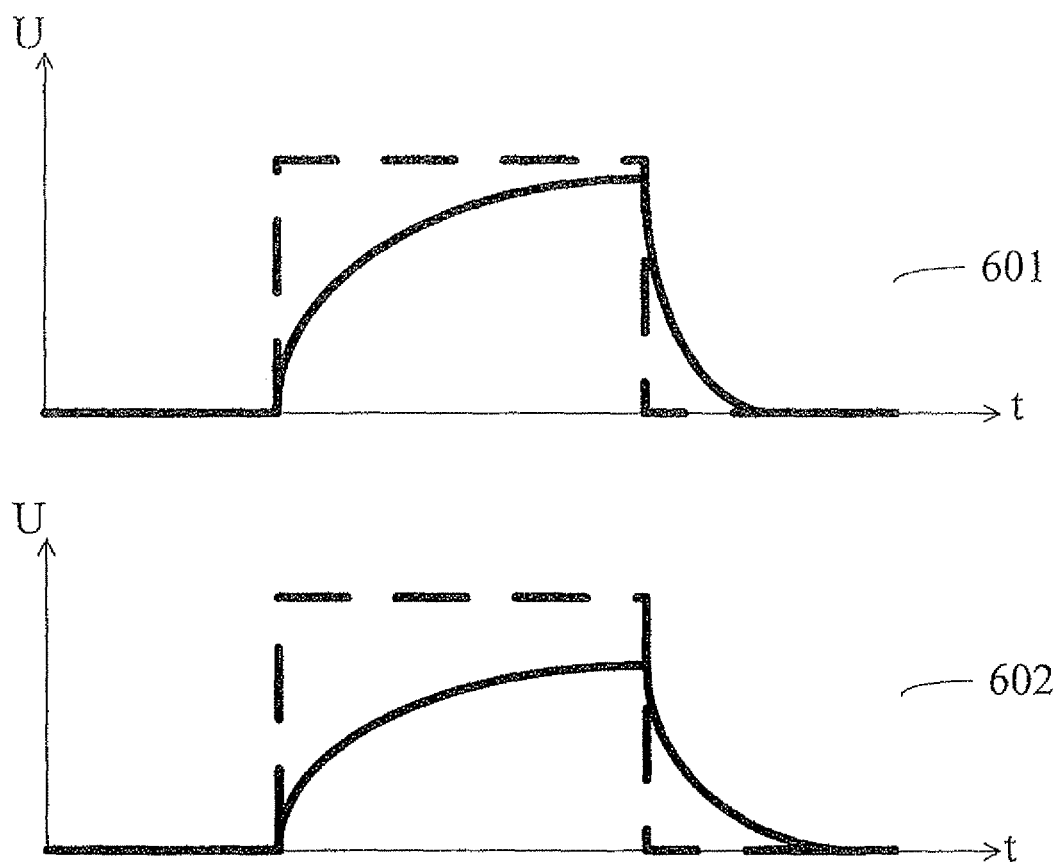
FIG. 6 is an electrical comparison diagram of the prior art and the present invention.

With such, a configuration, in accordance with the second embodiment of the present invention, the adjacent two pixel units 530 and 540 which their charging gate lines are apart from each other can share the same common electrode line 403. The intersection number of data line 405 and common electrode line 403 will therefore decrease by half, which means that the parasitic capacitance value of the data line and the common electrode line will decrease to half. Referring to FIG. 6, compared with the prior art array substrate 602, the array substrate 601 of the present invention has less RC delay. Thus, not only can the RC delay be effectively decreased and the pixel power rate enhanced, but the cost of extra wiring can also be decreased.

The present invention also relates to a liquid crystal display that comprises: an any substrate as shown in the first embodiment to the second embodiment of the present invention; a color filter substrate disposed opposite the array substrate; and a liquid crystal layer vertically aligned between the array substrate and the color filter substrate.

Figure 7:
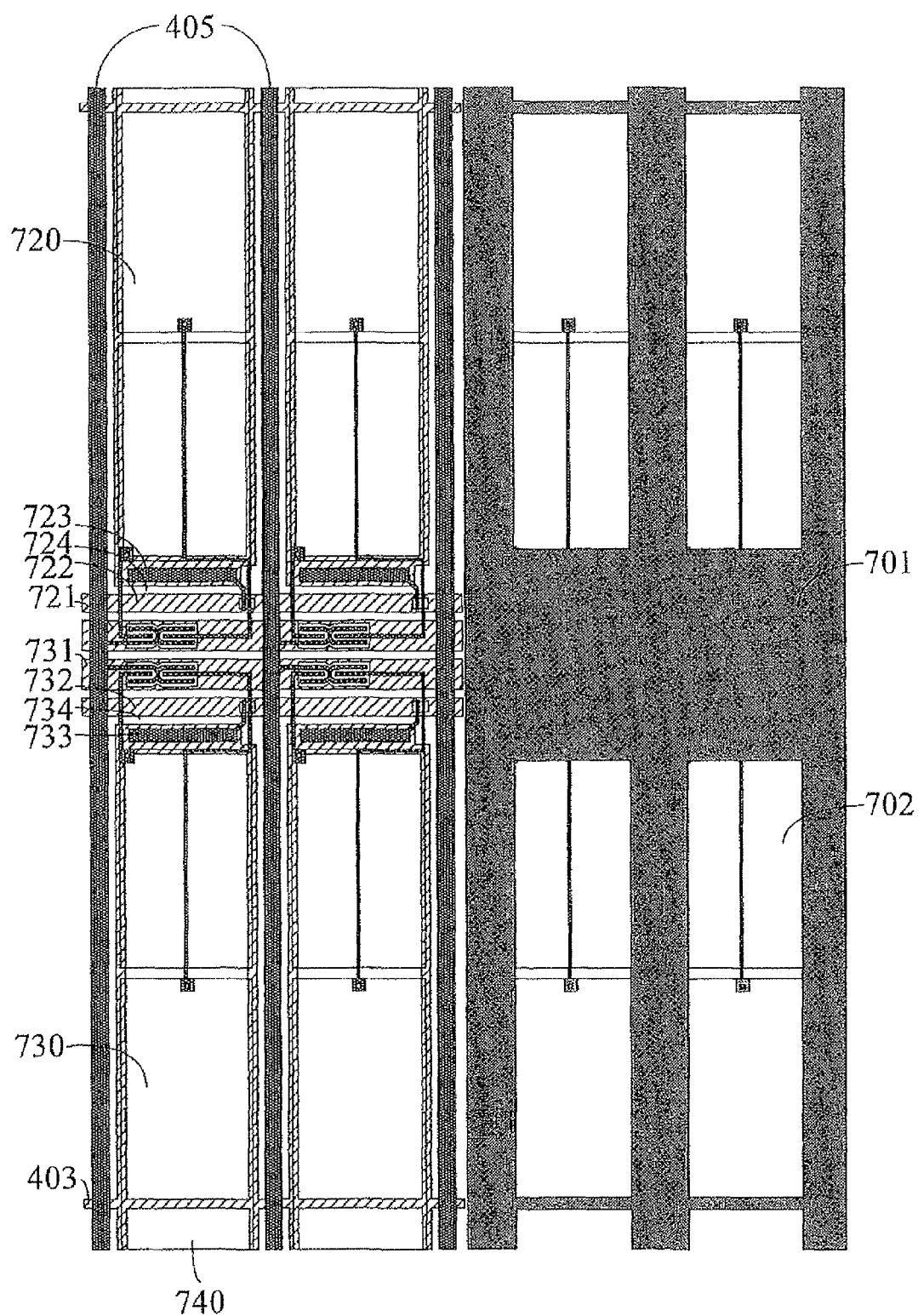
FIG. 7 is a schematic diagram showing that a black matrix perfectly shields an array substrate in the present invention.

FIG. 7 depicts the third embodiment of the present invention, wherein the color filter substrate further comprises a black matrix 701 disposed on the corresponding data line 405; charging gate lines 721 and 731; sharing capacitors 723 and 733, and the common electrode line 403 of the array substrate for shielding the light leakage among each pixel unit. The above mentioned data line 405, charging gate lines 721 and 731, sharing capacitors 723 and 733, and the common electrode line 403 are opaque metal components, so that the aperture ratio will not decreased by the arrangement of the black matrix 701.

Since the pixel units arranged in a plurality of rows along the extending direction of the data line 405, two adjacent pixel units are arranged sequentially in the opposite direction. Therefore, the charging gate lines 721 and 731 of the two adjacent pixel units 720 and 730 will be close to each other side by side and be gathered at the pixel junction, the sharing gate lines 722 and 732 with the sharing capacitors 723 and 733 of these two adjacent pixel units will also be gathered together at the pixel junction. Further, by using each of the sharing capacitors 723 and 733 of the two adjacent pixel units 720 and 730, the light leakage regions 724 and 734 below the corresponding sharing gate lines 722 and 732 will naturally be away from the openings of the pixel electrodes 720 and 730.

Figure 8:
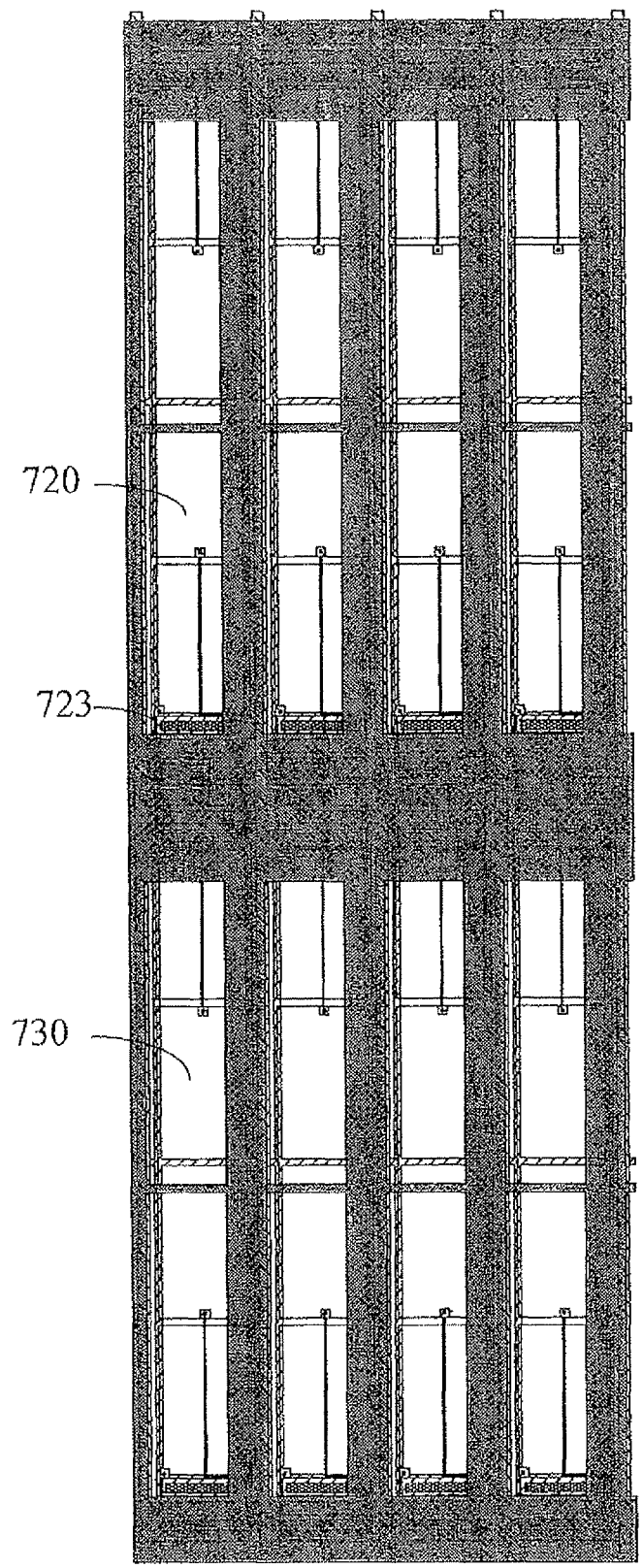
FIG. 8 is a schematic diagram illustrating that the color filter is misaligned with the array substrate.

Referring to FIG. 8, even though a misalignment occurs between the color filter substrate and the array substrate, especially the color filter is shifted downward with respect to the array substrate, the openings of the pixel units 720 and 730 can perform a light shielding effect by the sharing capacitor arrangement. Generally, the shift range between the array substrate and the color filter substrate is between 0-30 μm, while the width of the sharing capacitor is between 6-30 μm. Thus, there is no need to increase the width of the black matrix 701 shielding light leakage based on the pixel unit layout of the present invention. That means that the opening 702 of the black matrix in FIG. 7 can completely overlap the opening of the pixel unit, and the aperture ratio of the pixel unit will not decrease as the width of the black matrix increases, thus maximizing the aperture ratio of the pixel unit. Accordingly, the movable mura can be eliminated without losing the aperture ratio in present invention.

Please refer to FIG. 7. With such a configuration, in accordance with the fourth embodiment of the present invention, the adjacent two pixel units 730 and 740, with their charging gate lines apart from each other, can share the same common electrode line 403. The intersection number of data line 405 and common electrode line 403 will therefore decrease by half, which means that the parasitic capacitance value of the data line and the common electrode line will decrease to half. Referring to FIG. 6, compared with the prior art array substrate 602, the array substrate 601 of the present invention has less RC delay. Thus, not only can the RC delay be effectively decreased and the pixel power rate enhanced, but the cost of extra wiring can also be decreased.

As is understood by a person skilled in the art, the foregoing preferred embodiments of the present invention are illustrative, rather than limiting, of the present invention. It is intended that they cover various modifications, and similar arrangements be included within the spirit and scope of the appended claims, the scope of which should be accorded the broadest interpretation so as to encompass all such modifications and similar structures.

What is claimed is:

1. An array substrate comprising:
    a substrate;
    a plurality of data lines disposed on the substrate;
    a plurality of gate line groups intersecting the plurality of data lines;
    a plurality of common electrode lines intersecting the plurality of data lines, each of the plurality of common electrode lines, respectively, and each of the plurality of gate line groups, respectively, along with two adjacent data lines of the plurality of data lines defining a pixel unit, the pixel unit comprising:
    only one thin film transistor electrically connected to a data line of the plurality of data lines and a gate line group of the plurality of gate line groups;
    a first pixel electrode and a second pixel electrode electrically connected to the thin film transistor and disposed between the gate line group and a common electrode line of the plurality of common electrode lines, the first pixel electrode and the second pixel electrode receive a pixel data signal from the same data line through the only one thin film transistor; and
    a sharing capacitor electrically connected to the gate line group and disposed between the gate line group and the first and second pixel electrodes;
    wherein the sharing capacitor is gathered at a top portion of the pixel unit together with a charging gate line and a sharing gate line;
    wherein pixel units are arranged in a plurality of rows along an extending direction of the plurality of data lines, and two adjacent pixel units are arranged sequentially in opposite directions.

2. The array substrate as claimed in claim 1, wherein each of the gate line groups comprises the charging gate line and the sharing gate line which is disposed between the charging gate line and the sharing capacitor.

3. The array substrate as claimed in claim 1, wherein in each of the gate line groups which are close to each other, respective charging gate lines of two adjacent pixel units are arranged side by side and are gathered at a pixel junction.

4. The array substrate as claimed in claim 1, wherein adjacent two pixel units that have their gate line groups apart from each other share a same common electrode line.

5. The array substrate as claimed in claim 1, characterized in that the first pixel electrode and the second pixel electrode are transparent electrodes.

6. The array substrate as claimed in claim 1, wherein a width of the sharing capacitor is between 6-30 μm.

7. A liquid crystal display comprising:
    an array substrate;
    a color filter substrate disposed opposite the array substrate; and
    a liquid crystal layer vertically aligned between the array substrate and the color filter substrate, characterized in that the array substrate comprising:
    a substrate;
    a plurality of data lines disposed on the substrate;
    a plurality of gate line groups intersecting the plurality of data lines;
    a plurality of common electrode lines intersecting the plurality of data lines, each of the plurality of common electrode lines, respectively, and each of the plurality of gate line groups, respectively, along with two adjacent data lines of the plurality of data lines, defines a pixel unit, the pixel unit comprising:
    only one thin film transistor electrically connected to a data line of the plurality of data lines and a gate line group of the plurality of gate line groups;
    a first pixel electrode and a second pixel electrode electrically connected to the thin film transistor and disposed between the gate line group and a common electrode line of the plurality of common electrode lines, the first pixel electrode and the second pixel electrode receive a pixel data signal from the same data line through the only one thin film transistor; and
    a sharing capacitor electrically connected to the gate line group and disposed between the gate line group and the first and second pixel electrodes;
    wherein the sharing capacitor is gathered at a top portion of the pixel unit together with a charging gate line and a sharing gate line;
    wherein pixel units are arranged in a plurality of rows along an extending direction of the plurality of data lines, and two adjacent pixel units are arranged sequentially in opposite directions.

8. The liquid crystal display as claimed in claim 7, wherein each of the gate line groups comprise the charging gate line and the sharing gate line which is disposed between the charging gate line and the sharing capacitor.

9. The liquid crystal display as claimed in claim 7, wherein in each of the gate line groups, which are close to each other, respective charging gate lines of two adjacent pixel units are arranged side by side and are gathered at a pixel junction.

10. The liquid crystal display as claimed in claim 7, wherein adjacent two pixel units that have their gate line groups apart from each other share a same common electrode line.

11. The liquid crystal display as claimed in claim 7, wherein the first pixel electrode and the second pixel electrode are transparent electrodes.

12. The liquid crystal display as claimed in claim 7, wherein a width of the sharing capacitor is between 6-30 μm.

13. An array substrate comprising:
- a substrate;
- a plurality of data lines disposed on the substrate;
- a plurality of gate line groups intersecting the plurality of data lines;
- a plurality of common electrode lines intersecting the plurality of data lines, each of the plurality of common electrode lines, respectively, and each of the plurality of gate line groups, respectively, along with two adjacent data lines of the plurality of data lines defining a pixel unit, the pixel unit comprising:
- only one thin film transistor electrically connected to a data line of the plurality of data lines and a gate line group of the plurality of gate line groups;
- a first pixel electrode and a second pixel electrode electrically connected to the thin film transistor and disposed between the gate line group and a common electrode line of the plurality of common electrode lines, the first pixel electrode and the second pixel electrode receive a pixel data signal from the same data line through the only one thin film transistor; and
- a sharing capacitor electrically connected to the gate line group and disposed between the gate line group and the first and second pixel electrodes;

wherein each of the gate line groups comprises a charging gate line and a sharing gate line which is disposed between the charging gate line and the sharing capacitor;

the pixel units are arranged in a plurality of rows along an extending direction of the plurality of data line, and two adjacent pixel units are arranged sequentially in opposite directions;

in each of the gate line groups, which are close to each other, respective charging gate lines of two adjacent pixel units are arranged side by side and are gathered at a pixel junction;

adjacent two pixel units that have their gate line groups apart from each other share a same common electrode line;

wherein the sharing capacitor is gathered at a top portion of the pixel unit together with the charging gate line and the sharing gate line.

\* \* \* \* \*